United States Patent [19]
Schmidt et al.

[11] Patent Number: 5,939,887
[45] Date of Patent: Aug. 17, 1999

[54] METHOD FOR MEASURING SPECTRAL ENERGY INTERFERENCE IN A CABLE TRANSMISSION SYSTEM

[75] Inventors: David W. Schmidt; Gerald S. Harris, both of Portland, Oreg.

[73] Assignee: Tektronix, Inc., Wilsonville, Oreg.

[21] Appl. No.: 08/924,753

[22] Filed: Sep. 5, 1997

[51] Int. Cl.⁶ .......................... G01R 27/26; H04B 17/00
[52] U.S. Cl. ...................... 324/628; 324/613; 324/76.19; 455/67.3
[58] Field of Search ..................... 324/612, 613, 324/620, 628, 76.19, 76.23, 76.26, 76.27; 455/63, 67.2, 67.3, 202, 296, 501; 348/6, 17, 21, 180, 193, 470; 379/6, 414, 416; 333/12

[56] References Cited

U.S. PATENT DOCUMENTS

| | | | |
|---|---|---|---|
| 4,520,508 | 5/1985 | Reichert, Jr. | 455/67.2 |
| 4,839,583 | 6/1989 | Takano et al. | 324/77.19 |
| 5,073,822 | 12/1991 | Gumm et al. | 348/193 |
| 5,210,483 | 5/1993 | Amamoto et al. | 324/76.27 |
| 5,608,331 | 3/1997 | Newberg et al. | 324/613 |
| 5,761,614 | 6/1998 | Leitch | 455/67.3 |

*Primary Examiner*—Diep N. Do
*Attorney, Agent, or Firm*—William K. Bucher

[57] ABSTRACT

A method for measuring interference in a cable transmission system includes the step of establishing a spectrum frequency measurement window having start and stop frequencies and an amplitude threshold. Data is acquired over the window representative of the spectral energy of the cable transmission system within the window and the data is compared against the threshold value. If the data falls below the threshold value, indicating the absence of a carrier signal within the window, a display is generated characterizing the interference over the window. Additional measurement windows may be established having different start and stop frequencies and thresholds for measuring different portions of the cable transmission system frequency spectrum.

29 Claims, 4 Drawing Sheets

METHOD FOR MEASURING SPECTRAL ENERGY INTERFERENCE IN A CABLE TRANSMISSION SYSTEM

BACKGROUND OF THE INVENTION

The present invention relates generally to measuring spectral energy in a cable transmission system and more specifically to measuring interference in such systems.

Cable transmission systems, such as cable TV networks, local area networks, telephone exchange systems, and the like, have traditionally provided separate services to customers. In the era of what has been called convergence, cable transmission systems are being adapted to provide video, data, and voice over a single system. For example, most existing cable TV systems provide one way analog video to customers in a forward path over a broadband distribution system. The system includes a headend that processes incoming video signals from satellites, land-line microwave transmissions, local station antennae feeds, and local studio signals and combines these signal into a broadband signal. The broadband signal is coupled into one or more trunk lines having branching feeder lines. The feeder lines contain taps for coupling the broadband signal from the feeder line to coaxial cables connected to set-top converter boxes or cable ready television sets on customer premises. One type of set-top converter box demodulates the RF signal to baseband for processing, such as decoding, and remodulates the signal for channels 3 or 4 of the television receiver. Another type of set-top down converts the incoming signal directly to channels 3 or 4. There are cable TV systems that provide basic two-way communications from the headend to the customer premises and back using a reverse path established through the set-top converter box. This reverse path is used for ordering pay-per-view events, movies, and the like as well as status monitoring of such system components as power supplies and amplifiers from the headend.

As more interactive services are developed for cable transmission systems, such as internet access, video-on-demand, telephony and the like, the cable transmission system providers are upgrading their systems for digital transmission of voice, data, and video. The telco industry is upgrading its systems for transmitting video over existing twisted-pair cable. Cable TV system operators are upgrading their systems to provide voice and data over existing coaxial cable systems or deploying hybrid optical fiber-coaxial cable (HFC) networks. An exemplary HFC system employs optical fiber as the backbone from the headend to hubs or remote headends in the system. The broadband signal at the headend is converted to an optical signal and transmitted over the optical fiber backbone. The hubs or remote headends convert the optical signal back to an electrical signal and can add additional signals to the broadband signal, reassign programming to new channels, amplify the broadband signal, and the like, and reconverts the broadband signal to an optical signal. Optical fiber trunk lines couple the signal from the hubs or remote headends to fiber nodes. The fiber nodes convert the optical signal into an electrical signal and re-transmit the signal over the coaxial cable lines to customer premises. Alternatively, fiber may be brought directly into the customer premises. The coaxial cable or optical fiber connection to the customer premise's may be connected to a splitter with one output being coupled to the set-top converter box or cable ready television and another connector being coupled to a cable modem. The cable modem may be connected to interactive devices, such as a single computer or internet device or connected to a local loop where multiple computers and/or internet devices are on the loop. Data from these devices are transmitted by the cable modem on the reverse path using a TDMA modulated carrier. A TDMA carrier is "bursty" in nature and is only present when transmission is occurring.

One problem the providers are dealing with in these new digital systems is RF noise. The RF noise of particular concern is interference entering either the forward or reverse path and is referred to as "ingress". This interference may be caused by any number of things, such a home appliances, citizen-band radio, paging services, public safety transmissions (i.e. police and fire communications), and the like. Regardless of the source of interference, the presence of ingress reduces channel operating margins. Each customer premise has the potential of becoming an interference source and/or an entry point for ingress, which could affect all reverse signals coming into the headend.

What is needed is a diagnostic method for measuring and monitoring the ingress in cable transmission systems, such as cable TV systems and telephone networks. Such a method should be able to acquire, analyze, and display acquired data representative of interference over specified frequency ranges that are selectable by a user. The method should provide a spectral trace of the acquired data as well as provide a frequency and amplitude information of the significant interference within the defined frequency range.

SUMMARY OF THE INVENTION

Accordingly, an object of the present invention is to detect the presence of ingress in the form of interference in the spectral energy of a cable transmission system.

Another object of the present invention is to establish a spectral frequency measurement window for measuring the spectral energy of a cable transmission system for ingress.

A further object of the present invention is to provide a display characterizing the interference in the spectral energy of a cable transmission system.

The present invention is a method for measuring spectral energy in a cable transmission system having a headend for transmitting data to transceivers in a forward path and transmitting data from the transceivers to the headend in a reverse path over a distribution system. The method includes as an initial step of establishing a spectral frequency measurement window having a start frequency, a stop frequency and an amplitude threshold value. Data is acquired over the spectral frequency measurement window representing the magnitude of the spectral energy in the cable transmission system over the window. The acquired data is compared to the amplitude threshold value and a display is generated characterizing interference in the cable transmission system over the spectral frequency measurement window when the acquired data is less than the amplitude threshold value. If the acquired data is greater than the amplitude threshold value, the data acquisition and comparison steps are repeated without generating the display characterizing the interference.

The method of the present invention further includes the capability of establishing additional spectral frequency measurement windows having start and stop frequencies and amplitude thresholds. Data is acquired over each of the additional spectral frequency measurement windows and compared to the amplitude threshold value for the particular window. A display is generated for each measurement window characterizing interference in the cable transmission system over that spectral frequency measurement window when the acquired data is less than the amplitude threshold value. The data acquisition and the comparison steps are repeated for each additional window without generating the display when the acquired data is greater than the amplitude threshold value.

The data acquisition step of the present invention further includes the steps of digitizing the spectral energy over the spectral frequency measurement window for producing digital data values representing the magnitude of the spectral energy over the spectral frequency measurement window and storing the digital data values in a digital memory.

In the preferred embodiment of the invention, the generating steps further includes the step of calculating a delta value representative of the difference between the interference data point having the greatest magnitude and the threshold value, displaying the interference data in the form of a spectral trace on a display device, and displaying the start and stop frequencies, the delta value, and the frequency corresponding to the interference data point of the delta value. Alternately, the generating step may display the spectral trace of the acquired data or the start and stop frequencies, the delta value, and the frequency corresponding to the interference data point of the delta value.

In an alternative embodiment of the method according to the present invention, the establishing step includes the step of establishing sub-spectral frequency measurement windows within the spectral frequency measurement window with each sub-window having a start frequency and a stop frequency and an amplitude threshold value. The comparing includes the step of comparing the acquired data for each of the sub-windows to the amplitude threshold value for the respective sub-window and the generating step includes the step of generating a display characterizing the interference in the cable transmission system over the spectral frequency measurement window when the interference data for any of the sub-windows is less than the amplitude threshold value for that window. The generating step further includes the step of calculating delta values representative of the difference between the interference data point having the greatest magnitude in each sub-window and the threshold value for that sub-window and displaying the start and stop frequencies, the delta values, the frequencies corresponding to the data points of the delta values for each sub-window, and the interference data in the form of a spectral trace on a display device. Alternately, the generating step may display the spectral trace of the acquired data for the measurement window or the start and stop frequencies, the delta values, and the frequencies corresponding to the interference data points of the delta values for each sub-window.

The objects, advantages and novel features of the present invention are apparent from the following detailed description when read in conjunction with the appended claims and attached drawings.

DETAILED DESCRIPTION OF THE PREFERRED EMBODIMENT

The present invention is a method for measuring interference, referred to generally as "ingress", in a cable transmission system. The cable transmission system may be an interactive cable TV system, a telephone exchange network, a local area loop, or the like. Ingress, as used in the communications industry, generally refers to unintended radiation that enters the transmission system. Such radiation may be coherent in nature, such as generated by citizen band radio, municipal services transmissions, such as police and fire, paging services, and the like or non-coherent, such as might be generated by home appliances, automobile ignitions, and the like. The preferred embodiment of the present invention will be described below in relation to a reverse path in an interactive cable TV system. It is understood that the method of the present invention is applicable for both the forward and the reverse path of any cable transmission system.

Figure 1:
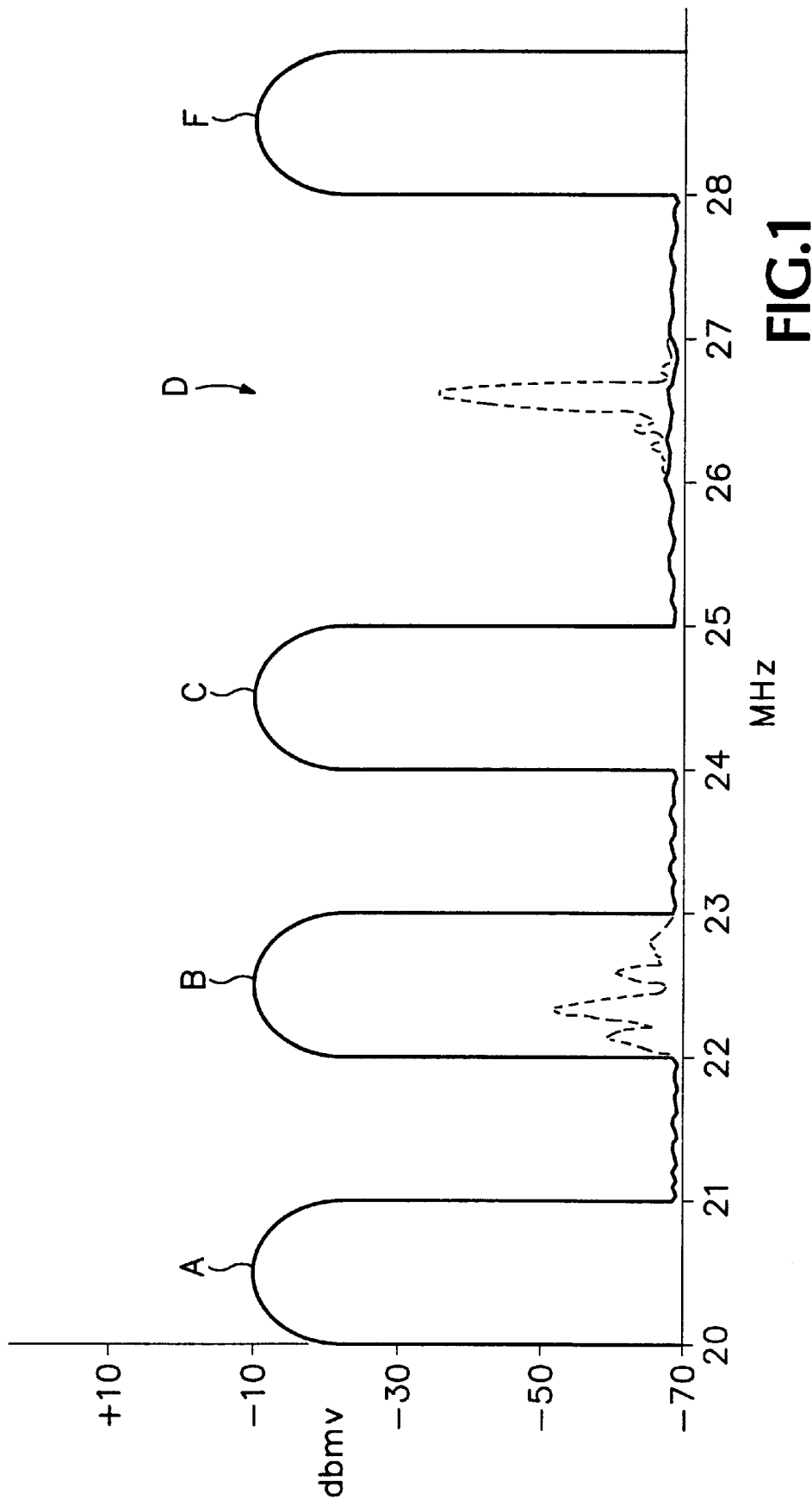
FIG. 1 is a representation of cable modem frequency bands in a portion of the reverse path in the method for measuring interference in a cable transmission system according to the present invention.

In an interactive cable TV transmission system, data is transmitted from a headend to multiple customer premises via a forward path over a coaxial cable or hybrid fiber-coaxial cable distribution system. Data transmitted from multiple customer premises to the headend is via a reverse path over the same distribution system. In such an interactive system, data received and sent from the customer premises requires some type of transceiver. One such transceiver is a cable modem. The frequency of the forward path generally starts in the range of 50 MHZ and continues upward with each video channel occupying a frequency band of 6 MHZ. Data transmissions generally occupy the upper frequency band, which currently is in the 700–800 MHZ frequency range. The frequency of the reverse path is generally in the range of 5–40 MHz depending on the configuration of the transmission system. In Europe, for example, the reverse path bandwidth can extend up to 55 MHz. Cable modems are preferably used for transmitting data over the reverse path using time division multiple access (TDMA) technology. TDMA signals are "bursty" in nature with each customer premise modem actively transmitting data during a prescribed time slot. During periods when the modem is not transmitting, the carrier signal is not present. TDMA allows multiple modems to operate at the same frequency increasing the capacity of the return path. FIG. 1 is a representation of a portion of the reverse path spectrum having multiple cable modems being assigned specific frequency bands, such as bands A, B, C, D and E. During periods of active transmission, the spectrum has a haystack like appearance, as shown in bands A, B, C and E. During periods when the modems are not actively transmitting, no spectral energy is present as represented in band D. There are many sources of ingress in the frequency band of the reverse path, as previously described, which can adversely affect the quality of all reverse path communications. The dashed line in bands B and D represent ingress in the reverse path. The method of measuring interference in a cable transmission system according to the present invention provides a diagnostic and monitoring tool for measuring the interference over specified frequency spectrum windows to determine the presence and amount of ingress that may affect reverse path transmissions.

Figure 2:
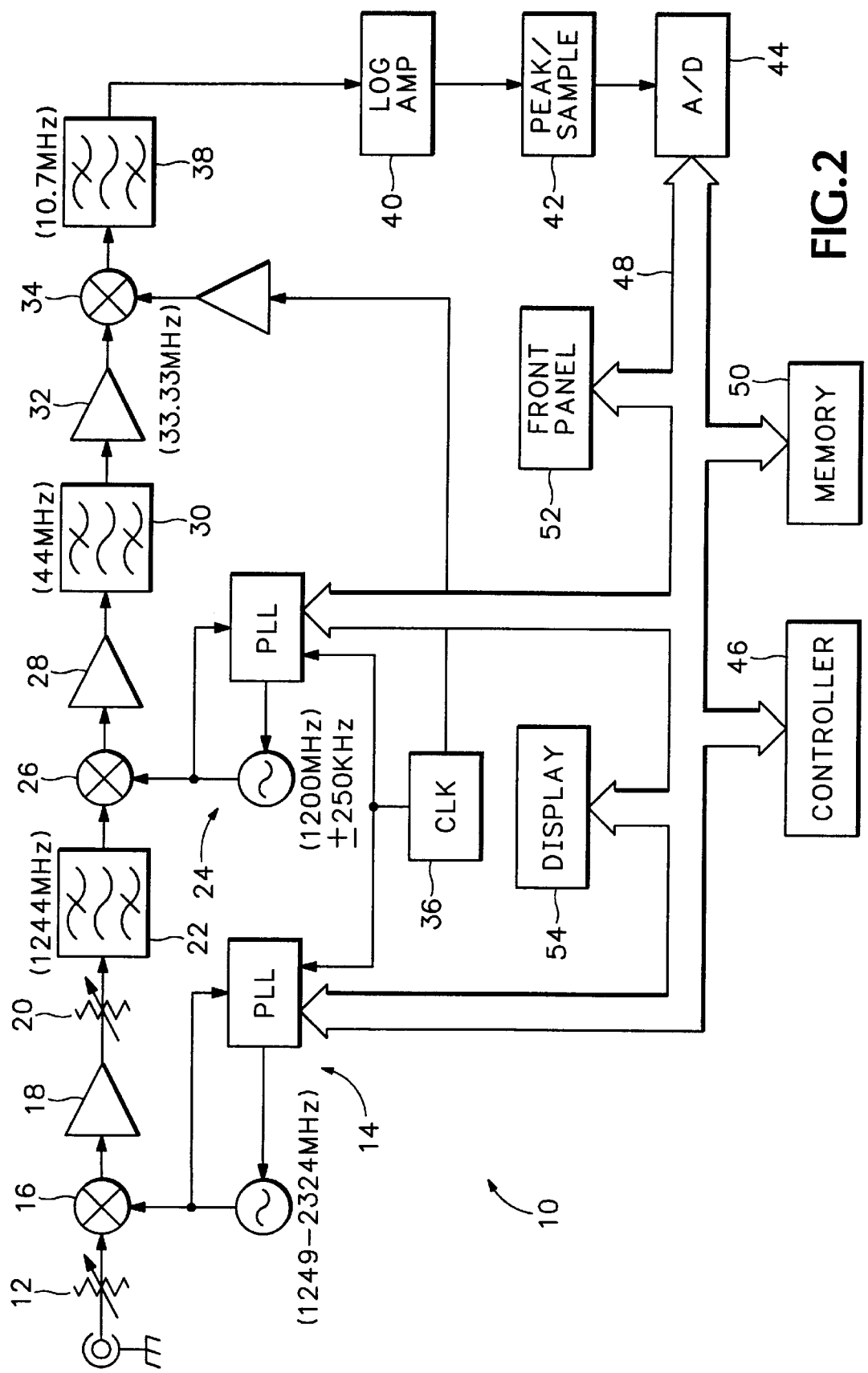
FIG. 2 is a representative block diagram of a measurement test instrument for implementing the method for measuring interference in a cable transmission system according to the present invention.

Referring to FIG. 2, there is shown a RF measurement test instrument 10 for use in implementing the method of measuring interference according to the present invention. The measurement test instrument 10 is a swept front-end device having a tuning range of 4.5 MHz to 1080 MHz and a minimum tuning increment of 10 KHZ. The amplitude range of the measurement test instrument 10 is −70 dbmV to +60 dbmV. A variable attenuator 12 attenuates the RF input signal that is mixed with a digitally controlled swept phase-locked loop (PLL) local oscillator 14 output in mixer 16 to beat the frequency of the input signal up to a first intermediate frequency. The output of the mixer 16 is coupled to amplifier 18 where the intermediate signal is amplified. The output of the amplifier 18 is coupled through variable attenuator 20 to bandpass filter 22 centered on 1244 MHz that rejects the unwanted signals from mixer 16. The filtered signal is then beat down by a second digitally controlled phase-locked loop (PLL) local oscillator 24 in mixer 26 to produce a second intermediate frequency. The second intermediate frequency is amplified and filtered by amplifiers 28 and 32 and bandpass filter 30 and coupled to third mixer 34. The third mixer 34 mixes a clock input from clock 36 to produce a final intermediate frequency signal for processing. Clock 36 is a crystal controlled oscillator, which in the preferred embodiment generates a 100 MHz clock output that is coupled to a divide by three counter for producing a 33.33 MHz clock input to the third mixer 34. The clock output is also coupled to a divide by sixteen counter that generates a 6.25 MHz clock signal input to the first and second local oscillators 14 and 24.

The final intermediate frequency signal from mixer 34 is filtered by bandpass filter 38 and amplified by log amplifier 40. The output of log amplifier 40 is coupled to a peak/sample detector 42. The output of the peak/sample detector is coupled to an analog-to-digital converter (A/D) 44 that converts the analog signal on its input to digital data representative of the magnitude of the analog signal spectrum. The digital data is passed to a controller 46 via bus 48 that includes data, address and control lines. Controller 46, operating under program control stored in memory 50, stores the data in memory 50 for further processing and display. Memory 50, coupled to bus 48, includes programmable read only memory (PROM) for storing program instructions and random access memory RAM including volatile and non-volatile memory for storing the acquired data and parameter settings. Front panel controls 52, such as keypad matrix, knobs, softkeys and the like, are also coupled to bus 48 along with a display 54, such as a cathode-ray-tube, liquid crystal display, or the like. The display may be driven by the controller 46 or may have a separate display processor. The controller 46 is further coupled to the PLLs of local oscillators 14 and 24 via bus 48 for providing values to programmable dividers in the phase-locked loops for incrementally stepping through a selected frequency span. In the preferred embodiment, the first and second local oscillators 14 and 24 operate in a nested fashion with the second local oscillator 24 incrementing in 10 KHz steps over a range of ±250 KHz and the first local oscillator incrementing at a 250 KHz rate when the second local oscillator 24 reaches its limit.

Figure 3:
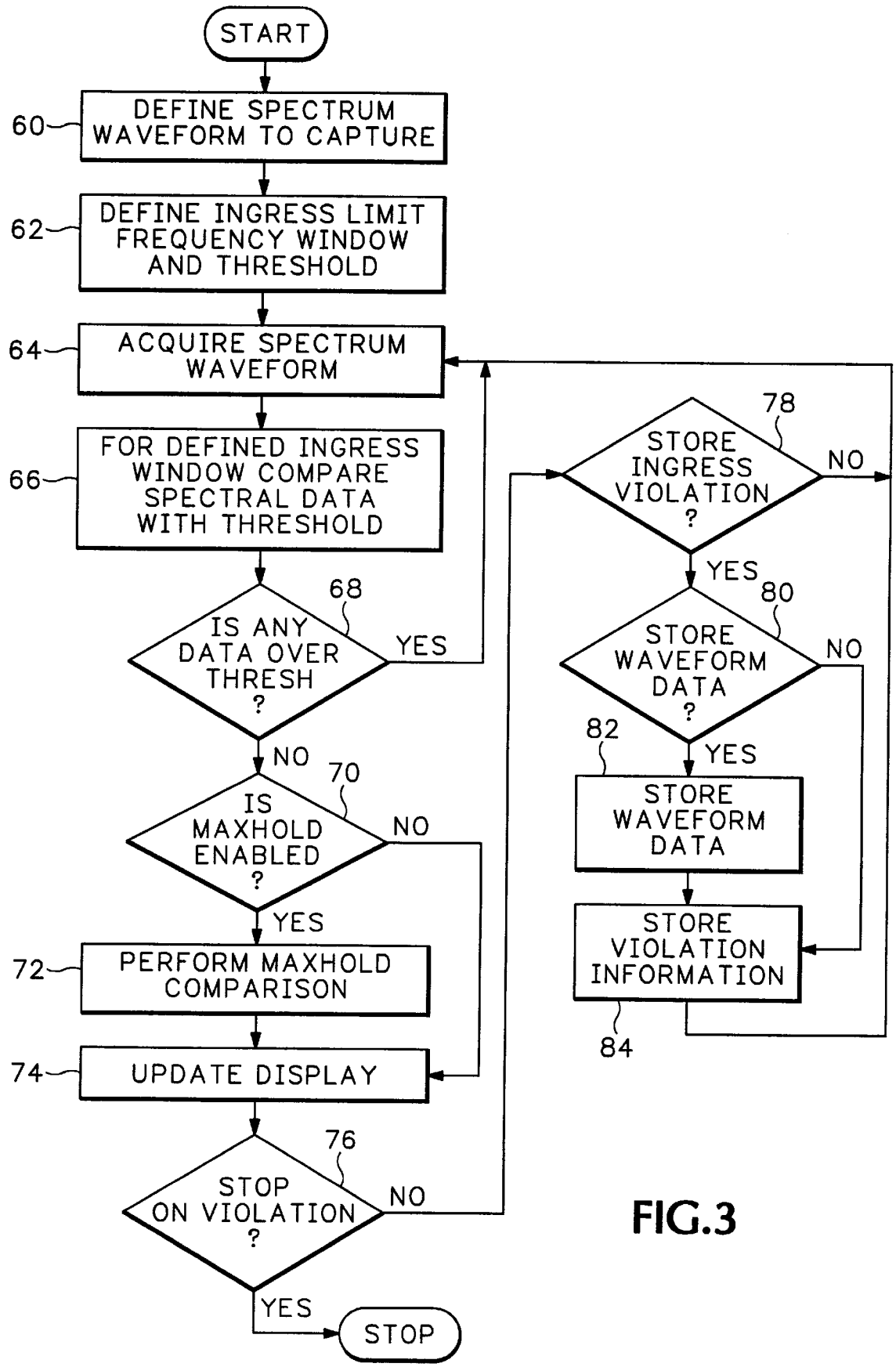
FIG. 3 is a flow chart showing the steps for measuring interference in a cable transmission system according to the present invention.

Referring to FIG. 3, there is flow chart showing the steps associated with the method of measuring spectral energy in a cable transmission system for interference. The front panel controls 54 of the measurement test instrument 10 are used to call a set-up routine stored in memory 50 for allowing an operator to set measurement parameters including a center frequency and frequency span for the instrument as shown in step 60, and a start frequency, a stop frequency, and an amplitude threshold for a spectral frequency measurement window as shown in step 62. In the preferred embodiment, the minimum frequency span of the spectral frequency measurement window is 10 KHz with the maximum limit being the tuning range of the measurement test instrument 10. The minimum increment for the measurement window is 10 KHz. In a typical measurement set-up for monitoring ingress in the return path, an operator sets the spectral frequency measurement window for a range that includes the carrier frequency of a channel modem, for example 20–21 MHz. The operator sets the amplitude threshold value somewhat below the peak amplitude of the carrier signal, for example 5 dB below the carrier peak amplitude.

Figure 4:
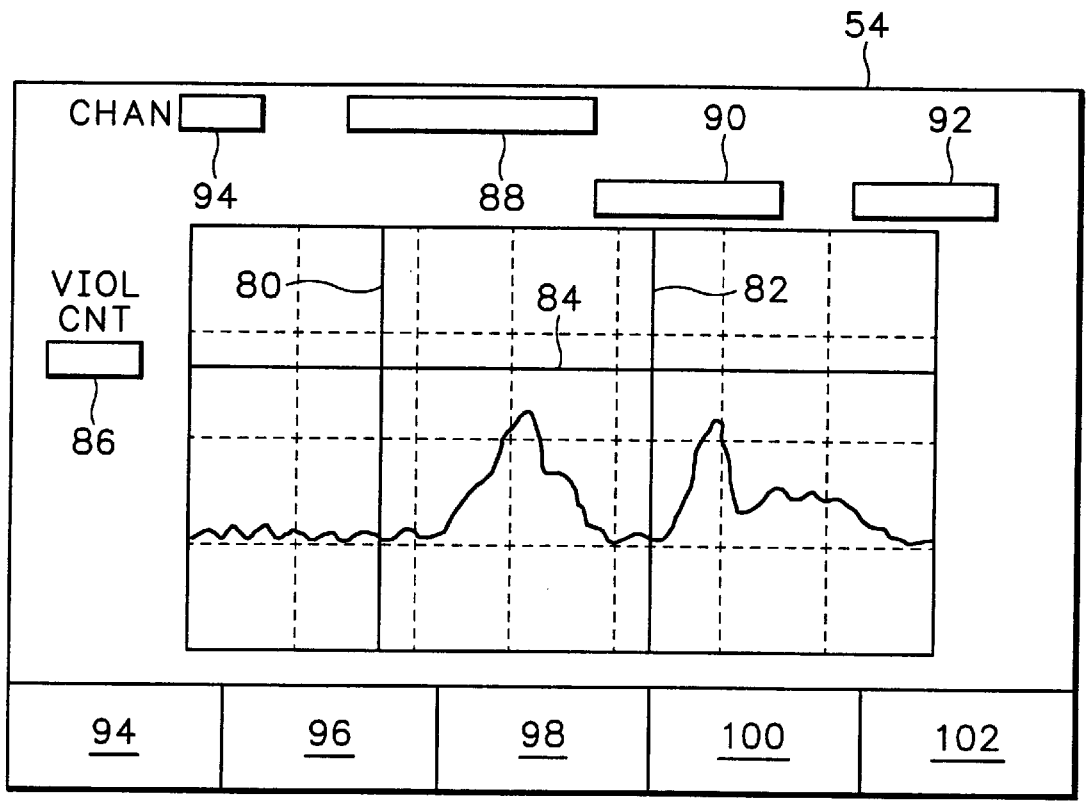
FIG. 4 is a representative display of the acquired spectral data and spectral frequency measurement window in the method for measuring interference in a cable transmission system according to the present invention.

The controller 46 interprets the received front panel input and generates programmable divider values that set the frequencies of the first and second local oscillators to incrementally step through the selected frequency span. The parameter setting routine also allows the operator to set various monitoring modes. In the preferred embodiment of the present invention, all monitoring modes display a spectral trace of the acquired spectral data on display 54 as part of generating a display for characterizing the interference, as shown in the representative display of FIG. 4. The spectral frequency measurement window is shown on the display of FIG. 4 as vertical cursors 80 and 82 for the start and stop frequencies and a horizontal cursor 84 for the amplitude threshold value. Additional data displayed includes the center frequency 88, the horizontal and vertical scales of the display, respectively numbered 90 and 92, and a channels designator 94. Other regions of the display, such as 94, 96, 98, 100, and 102 are associated with front panel softkeys for setting-up measurement parameters and controlling the measurement instrument. The channel designator is a function that sets the center frequency and frequency span of the instrument for a specific channel in the cable TV system. Alternately, the monitoring modes may provide alphanumeric information related to the acquired spectral data or a combination of both alphanumeric information and the spectral trace. Additionally, a MAXHOLD display function for the spectral trace may be enabled for each monitoring mode.

In one mode, continuous acquisitions of spectral data are made over the frequency span with the spectral data over the measurement window being analyzed for violations. A violation is defined for the present invention as occurring when all of the acquired spectral data over the measurement window does not exceed the amplitude threshold value. When a violation occurs, the spectral data from latest acquisition is displayed as a spectral trace on display 54 with newly acquired spectral data overwriting any previously stored spectral data. A violation counter 86 is incremented and displayed for each occurrence of a violation. The spectral trace is not updated when there is no violation detected in the acquired spectral data over the measurement window.

A second monitoring mode continuously acquires spectral data over the frequency span and analyzes the data over the measurement window for violations, generates a display of the spectral data as a spectral trace on display 54 along with the measurement window cursors and the instrument set-up parameters, and stores data related to the acquisition in the non-volatile portion of memory 50 for later recall and display. This data includes a calculated delta value that is the difference between the amplitude threshold value and the acquired spectral data point having the greatest magnitude value, and the frequency of the delta value. The spectral data, the cursors for the start and stop frequencies and amplitude threshold value of the measurement window and the instrument parameter settings may also be stored depending on the initial instrument set-up for this mode. The start and stop frequencies and the amplitude threshold value of the measurement window and the delta value with its associated frequency along with the instrument set-up parameter values may also be displayed separately as alphanumeric information.

A third mode acquires spectral data over the frequency span with the spectral data over the measurement window being analyzed for violations. If a violation is detected, further acquisitions are stopped and the acquired data is displayed as a spectral trace with the associated measurement window cursors and alphanumeric instrument set-up information.

Using the front panel controls 54, the operator initiates the acquisition of data over the frequency span that includes the spectral frequency measurement window as shown in step 64 of FIG. 3. The first and second local oscillators 14 and 24 work in conjunction to incrementally sweep over the selected frequency span generating an intermediate frequency output to the third mixer where it is mixed with the divided clock signal to produce the final intermediate frequency. The final intermediate frequency is amplified in the log amplifier sampled in the peak/sample detector. A/D receives the peak/sample detector output and converts the frequency spectrum data to digital data representative of the magnitude of the spectral energy over the frequency span. The spectral data within the spectral frequency measurement window is compared to the amplitude threshold value as shown in step 66. The comparison of the digital data with the threshold may be performed as the data is received by the controller or the data may be stored in memory 50 until the all of the spectral data for the frequency span is acquired where upon the data for the measurement window is read out and compared to the threshold value. In either case, a violation occurs when the acquired spectral data over the measurement window is less than the threshold value as is shown in step 68. A violation does not occur if any of the acquired spectral data within the measurement window is greater than the threshold value. When a violation does not occur, a new spectral data acquisition is made as shown by the loop back to step 64.

If the MANHOLD function is enabled as shown in step 70, the magnitudes of each of the currently acquired frequency data points are compared with the magnitudes of corresponding saved frequency data points from the previous acquisitions and the acquired waveform data is updated with the largest magnitude for each frequency data point as shown in step 72. If MAXHOLD is not enabled, the spectral trace of display 54 is updated with the currently acquired spectral data as shown in step 74. With MAXHOLD enabled, the spectral trace display is updated with the MAXHOLD data as shown in step 74. The delta value and its associated frequency may be displayed with the spectral trace or the measurement window parameter data and the delta value data may be displayed on a separate screen display.

If the third monitoring mode is enabled, data acquisition is stopped on the detection of a violation as shown in decision step 76. If the first monitoring mode is enabled, as shown in decision step 78, additional spectral data acquisitions are made as indicated by the loop back to step 64. If the second monitoring mode is enabled, as shown in step 78, the waveform data may be stored as shown in decision step 80. The waveform data includes the acquired spectral data and the parameter settings associated with the spectral frequency measurement window and the instrument set-up. The violation information, which includes the delta value and its associated frequency, is stored as shown in step 82. The waveform data and the violation information is stored in non-volatile portion of memory 50 for later recall and display. Additional spectral data acquisitions are made in the second monitoring mode as indicated by the loop back to step 64.

Additional spectral frequency measurement windows may be established under the preferred embodiment of the present invention. Up to thirty-two separate windows may be established with each window having start and stop frequencies and an amplitude threshold value. The characteristics of the interference for each of the thirty-two windows may be saved for later display using the second monitoring mode. The start and stop frequencies and the amplitude threshold for each of the measurement windows can also be saved for later recall. Each measurement window is individually called with the spectral data being acquired over that window, processed and displayed as shown by the process steps of FIG. 3 before the next measurement window is invoked.

Figure 5:
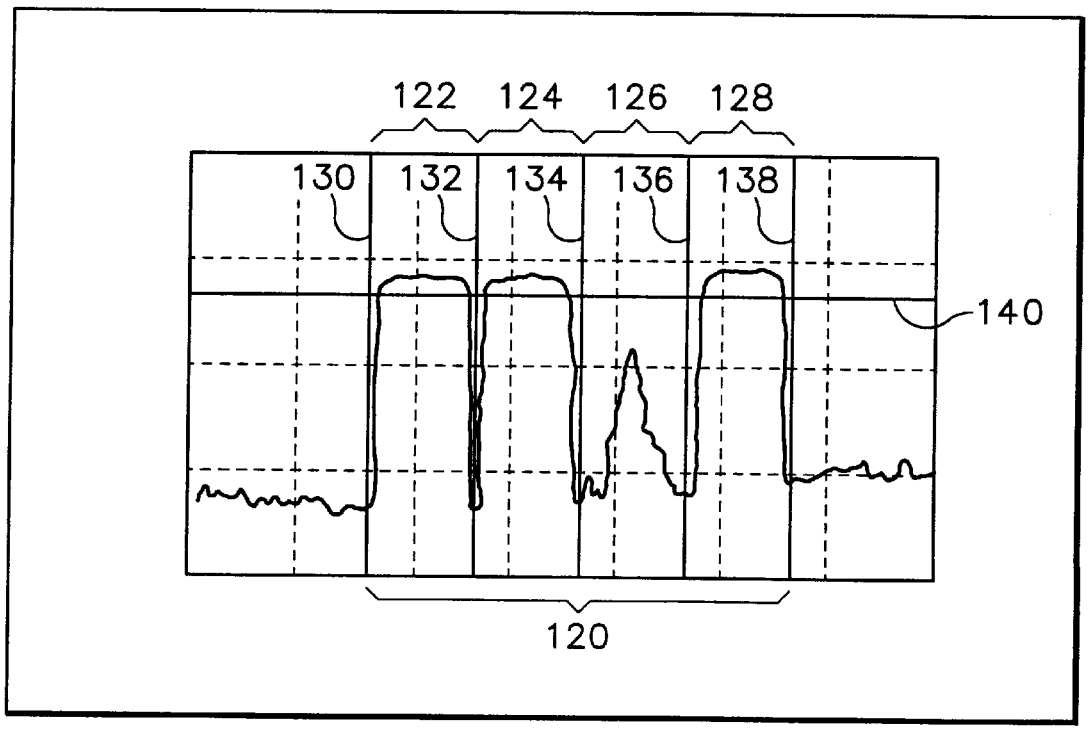
FIG. 5 is a representative display of sub-windows in a spectral frequency measurement window in the method for measuring interference in a cable transmission system according to the present invention.

In an alternative embodiment of the present invention, the spectral frequency measurement window 120 may be divided into sub-windows 122, 124, 126, 128 with each sub-window having a start and a stop frequency and the same or different amplitude threshold values as representatively shown in FIG. 5. The display of FIG. 5 would also include the additional display elements shown in FIG. 4. The same monitoring modes, as previously described, function with the sub-windows. Specifically, spectral data is acquired over the selected frequency span of the instrument with the acquired data for each sub-window being compared to the amplitude threshold value for the respective sub-window. If a violation occurs in any of the sub-windows, the acquired spectral data for the frequency span is displayed along with the cursors for the start and stop frequencies 130, 132, 134, 136 and 138 and amplitude thresholds of the sub-windows 140 and/or the characteristics of the violation occurring within each sub-window having a violation, which are determined and stored. The characteristics of the violation include the delta value and the frequency of the delta value for each violation.

The present method for measuring the spectral energy in a cable transmission system for interference has been described using swept front end RF measurement instrument for acquiring spectral data in the frequency domain. It is also possible to implement the present invention using a measurement test instrument that acquires data in the time domain and processes the digitized time domain data into the frequency domain using Fast Fourier Transform (FFT) algorithms. Limitation on such an implementation include the speed and amount of data that can be acquired in the time domain and transformed into the frequency domain and the dynamic range of the digitization process. Once the time domain data has been converted into digital data representative of the frequency spectrum, a spectral frequency measurement window is established having start and stop frequencies and an amplitude threshold level for measuring the interference over the measurement window as was previously described.

A method and associated apparatus has been described for measuring spectral energy in a cable transmission system for interference where a spectral frequency measurement window is established having start and stop frequencies and a amplitude threshold value. Data is acquired over the spectral frequency measurement window representative of the magnitude of the spectral energy in the cable transmission system over the window. The acquired data is compared to a threshold value and a display is generated characterizing the interference in the cable transmission system over the measurement window when the acquired data is less than the threshold value. The displayed data includes a spectral trace of the acquired data, cursors representing the measurement window, and alphanumeric information related to the acquisition. A separate alphanumeric display may be used to display the information on the start and stop frequencies and threshold value of the measurement window as well as information on a delta value. Additional spectral frequency measurement windows may be established and used for characterizing the interference over other frequency ranges and amplitudes. Further, sub-measurement windows may be established within a spectral frequency measurement window for monitoring the interference over multiple frequency bands. While the disclosure is made in terms of a preferred embodiment, the invention is not intended to be so limited. These and other aspects of the present invention are set forth in the appended claims.

What is claimed is:

1. A method for measuring spectral energy in a cable transmission system having a headend for transmitting data to transceivers in a forward path and transmitting data from the transceivers to the headend in a reverse path over a distribution system comprising the steps of:

1) establishing a spectral frequency measurement window having a start frequency and a stop frequency and an amplitude threshold value;
   2) acquiring data over the spectral frequency measurement window representative of the magnitude of the spectral energy in the cable transmission system over the window;
   3) comparing the acquired data to the amplitude threshold value; and
   4) generating a display characterizing interference in the cable transmission system over the spectral frequency measurement window when the acquired data is less than the amplitude threshold value.

2. The method for measuring spectral energy in a cable transmission system as recited in claim 1 wherein the acquiring step further comprises the steps of:

1) digitizing the spectral energy over the spectral frequency measurement window for producing digital data values representing the magnitude of the spectral energy over the spectral frequency measurement window; and
   2) storing the digital data values in a digital memory.

3. The method for measuring spectral energy in a cable transmission system as recited in claim 2 wherein the generating step further comprises the step of displaying the interference data in the form of a spectral trace on a display device.

4. The method for measuring spectral energy in a cable transmission system as recited in claim 3 wherein the generating step further comprises the step of displaying the start and stop frequencies and the amplitude threshold value of the spectral frequency measurement window with the spectral trace on a display device.

5. The method for measuring spectral energy in a cable transmission system as recited in claim 3 wherein the generating step further comprises the step of displaying the start and stop frequencies and the amplitude threshold value of the spectral frequency measurement window as cursors associated with the spectral trace on the display device.

6. The method for measuring spectral energy in a cable transmission system as recited in claim 2 wherein the generating step further comprises the step of calculating a delta value representative of the difference between the threshold value and the interference data point having the greatest magnitude.

7. The method for measuring spectral energy in a cable transmission system as recited in claim 6 wherein the generating step further comprises the step of displaying the delta value and the frequency corresponding to the interference data point of the delta value.

8. The method for measuring spectral energy in a cable transmission system as recited in claim 6 wherein the generating step further comprises the step of displaying the start and stop frequencies and the amplitude threshold value of the spectral frequency measurement window, the delta value, the frequency corresponding to the data point of the delta value, and the interference data in the form of a spectral trace on a display device.

9. The method for measuring spectral energy in a cable transmission system as recited in claim 8 wherein the generating step further comprises the step of displaying the start and stop frequencies and the amplitude threshold value of the spectral frequency measurement window as cursors associated with the spectral trace on the display device.

10. The method for measuring spectral energy in a cable transmission system as recited in claim 1 further comprising the step of repeating steps 1 through 4 for an additional spectral frequency measurement window.

11. The method for measuring spectral energy in a cable transmission system as recited in claim 10 wherein the acquiring step further comprises the steps of:

1) digitizing the spectral energy over the additional spectral frequency measurement window for producing digital data values representing the magnitude of the spectral energy over the additional spectral frequency measurement window; and
   2) storing the digital data values in a digital memory.

12. The method for measuring spectral energy in a cable transmission system as recited in claim 11 wherein the generating step further comprises the step of displaying the interference data of the additional spectral frequency measurement window in the form of a spectral trace on a display device.

13. The method for measuring spectral energy in a cable transmission system as recited in claim 12 wherein the generating step further comprises the step of displaying the start and stop frequencies and the amplitude threshold value of the additional spectral frequency measurement window with the spectral trace on a display device.

14. The method for measuring spectral energy in a cable transmission system as recited in claim 12 wherein the generating step further comprises the step of displaying the start and stop frequencies and the amplitude threshold value of the additional spectral frequency measurement window as cursors associated with the spectral trace on the display device.

15. The method for measuring spectral energy in a cable transmission system as recited in claim 11 wherein the generating step further comprises the step of calculating a delta value representative of the difference between the threshold value of the additional spectral frequency measurement window and the interference data point having the greatest magnitude.

16. The method for measuring spectral energy in a cable transmission system as recited in claim 15 wherein the generating step further comprises the step of displaying the delta value and the frequency corresponding to the interference data point of the delta value of the additional spectral frequency measurement window.

17. The method for measuring spectral energy in a cable transmission system as recited in claim 15 wherein the generating step further comprises the step of displaying the start and stop frequencies and the amplitude threshold value of the additional spectral frequency measurement window, the delta value, the frequency corresponding to the data point of the delta value, and the interference data of the additional spectral frequency measurement window in the form of a spectral trace on a display device.

18. The method for measuring spectral energy in a cable transmission system as recited in claim 17 wherein the generating step further comprises the step of displaying the start and stop frequencies and the amplitude threshold value of the additional spectral frequency measurement window as cursors associated with the spectral trace on the display device.

19. The method for measuring spectral energy in a cable transmission system as recited in claim 1 wherein the establishing step further comprises the step of establishing sub-spectral frequency measurement windows within the spectral frequency measurement window with each sub-window having a start frequency and a stop frequency and an amplitude threshold value.

20. The method for measuring spectral energy in a cable transmission system as recited in claim 19 wherein the acquiring step further comprises the steps of:
1) digitizing the spectral energy over the spectral frequency measurement window for producing digital data values representing the magnitude of the spectral energy over the spectral frequency measurement window; and
2) storing the digital data values in a digital memory.

21. The method for measuring spectral energy in a cable transmission system as recited in claim 20 wherein the comparing step further comprises the step of comparing the acquired data for each of the sub-windows to the amplitude threshold value for the respective sub-window.

22. The method for measuring spectral energy in a cable transmission system as recited in claim 21 wherein the generating step further comprises the step of generating a display characterizing the interference in the cable transmission system over the spectral frequency measurement window when the interference data for any of the sub-windows is less than the amplitude threshold value for that sub-window.

23. The method for measuring spectral energy in a cable transmission system as recited in claim 22 wherein the generating step further comprises the step of displaying the interference data in the form of a spectral trace on a display device.

24. The method for measuring spectral energy in a cable transmission system as recited in claim 23 wherein the generating step further comprises the step of displaying the start and stop frequencies and the amplitude threshold values of the sub-windows with the spectral trace of the interference data on a display device.

25. The method for measuring spectral energy in a cable transmission system as recited in claim 23 wherein the generating step further comprises the step of displaying the start and stop frequencies and the amplitude threshold values of the sub-windows as cursors associated with the spectral trace on the display device.

26. The method for measuring spectral energy in a cable transmission system as recited in claim 22 wherein the generating step further comprises the step of calculating delta values representative of the difference between the interference data point having the greatest magnitude in each sub-window and the threshold value for that sub-window.

27. The method for measuring spectral energy in a cable transmission system as recited in claim 26 wherein the generating step further comprises the step of displaying the delta values and the frequencies corresponding to the interference data points of the delta values for each sub-window.

28. The method for measuring spectral energy in a cable transmission system as recited in claim 26 wherein the generating step further comprises the step of displaying the start and stop frequencies and the amplitude threshold values of each sub-window, the delta values, the frequencies corresponding to the data points of the delta values for each sub-window, and the interference data in the form of a spectral trace on a display device.

29. The method for measuring spectral energy in a cable transmission system as recited in claim 28 wherein the generating step further comprises the step of displaying the start and stop frequencies and the amplitude threshold value of the spectral frequency measurement window as cursors associated with the spectral trace on the display device.

* * * * *